(No Model.)
P. N. FRENCH.
CAR SPRING.
No. 459,249. Patented Sept. 8, 1891.
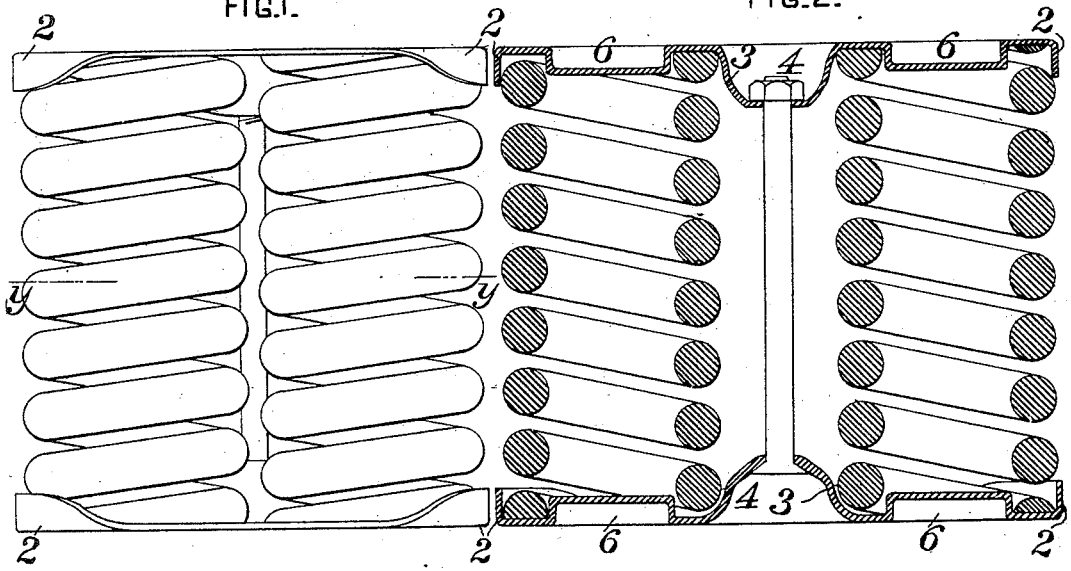
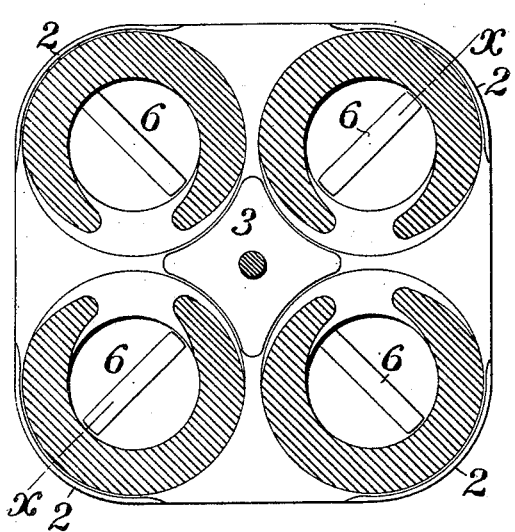
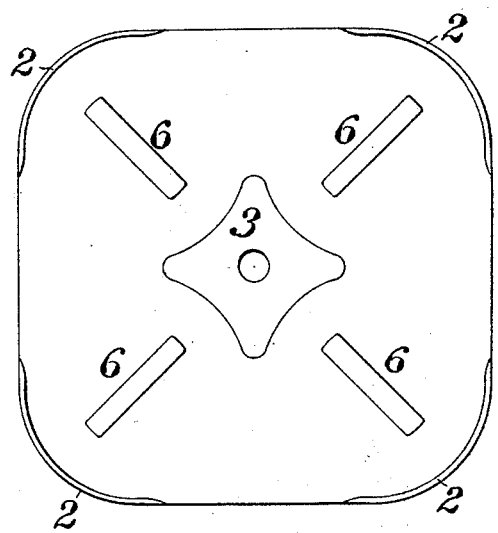
WITNESSES:
Dennis S. Wolcott
H. E. Gaither.
INVENTOR,
Philo N. French
by George N. Christy
Att'y.

UNITED STATES PATENT OFFICE.

PHILO N. FRENCH, OF PITTSBURG, PENNSYLVANIA, ASSIGNOR TO THE A. FRENCH SPRING COMPANY, LIMITED, OF SAME PLACE.

CAR-SPRING.

SPECIFICATION forming part of Letters Patent No. 459,249, dated September 8, 1891.

Application filed May 28, 1891. Serial No. 394,371. (No model.)

*To all whom it may concern:*

Be it known that I, PHILO N. FRENCH, a citizen of the United States, residing at Pittsburg, in the county of Allegheny and State of Pennsylvania, have invented or discovered certain new and useful Improvements in Car-Springs, of which improvements the following is a specification.

The invention described herein relates to certain improvements in bolster-springs for cars, and has for its object certain improvements in the cap or spring plates for the several springs, forming a nest or cluster; and in general terms the invention consists in the construction and combination substantially as hereinafter described and claimed.

In the accompanying drawings, forming a part of this specification, Figure 1 is a view in side elevation of a bolster-spring provided with my improved cap or seat plates. Fig. 2 is a sectional elevation thereof, the plane of section being indicated by the line $x$ $x$, Fig. 3. Fig. 3 is a sectional plan view, the plane of section being indicated by the line $y$ $y$, Fig. 1; and Fig. 4 is a plan view of one of the plates.

In the practice of my invention I take wrought-metal plates of suitable thickness and of proper dimensions for the reception, say, of four springs, and turn up the corners thereof on curved lines whose centers correspond with the centers of the springs when in position, thereby forming curved flanges 2 at the corners of the plate adapted to prevent any outward movement of the springs. By means of suitable dies or hammers a portion of the center of each plate is struck up, thereby forming central bosses or projections 3. The portions of the walls of these bosses or projections opposite the flanges 2 are made concave for the reception of portions of the edges of the springs. While it is not necessary in so far as the supporting of the spring is concerned to make the bosses or projections of a height greater than half the diameter of the rod of which the spring is formed, it is preferred to make the projections greater, thereby forming comparatively deep sockets 4 for the reception of the head and nut of the bolt connecting the cap and base plates and permitting of the movement of said plates when the springs are compressed without the bolts coming in contact with the bolster or other parts bearing on the plates. While the flanges of the plates and the concave recesses in the central bosses or projections afford ample security as against any lateral movement of the springs under usual conditions of use, it is preferred to provide additional security as against such movement, and to this end radial ribs 6 are formed by stamping up the metal in lines extending radially, or approximately so, from the center of the plate toward the corners thereof. These ribs are made any length approximately equal to the internal diameter of the springs, as shown in Fig. 3. In addition to forming a support for the spring, as stated, these ribs will render the plates much more rigid as against any flexure or bending at the corners. By means of suitable dies these plates may be formed at one operation, the blanks being suitably heated prior to being placed in such dies.

I claim herein as my invention—

1. The combination, with a cluster of springs, of cap and base plates, each provided with curved flanges on its outer perimeter, and a central boss or projection having concave recesses opposite the curved flanges, substantially as set forth.

2. The combination, with a cluster of springs, of cap and base plates, each provided with curved flanges on its outer perimeter, and a hollow central boss or projection having concave recesses opposite the curved flanges, said bosses or projections being adapted to receive the head or nut of the bolt connecting said plates, substantially as set forth.

3. The combination, with a cluster of springs, of cap and base plates, each provided with curved flanges on its outer perimeter, and a central boss or projection having concave recesses opposite the curved flanges, and ribs arranged radially between the flanges and recesses and adapted to fit within the springs, substantially as set forth.

4. The combination, with a cluster of springs, of cap and base plates, each provided at its corners with curved flanges, and a central boss or projection having concave recesses opposite the curved flanges, substantially as set forth.

In testimony whereof I have hereunto set my hand.

PHILO N. FRENCH.

Witnesses:
W. B. CORWIN,
DARWIN S. WOLCOTT.